Oct. 12, 1965

T. J. DOLPHIN 3,211,983

MOTOR SPEED CONTROL APPARATUS

Filed Oct. 18, 1962

WITNESSES
John L. Chopp
James F. Young

INVENTOR
Thomas J. Dolphin
BY  M.M.Brodahl
ATTORNEY

United States Patent Office 3,211,983
Patented Oct. 12, 1965

3,211,983
MOTOR SPEED CONTROL APPARATUS
Thomas J. Dolphin, Williamsville, N.Y., assignor to Westinghouse Electric Corporation, Pittsburgh, Pa., a corporation of Pennsylvania
Filed Oct. 18, 1962, Ser. No. 231,473
6 Claims. (Cl. 318—338)

The present invention relates in general to a motor speed control apparatus, and more particularly to a speed control apparatus for a direct current motor operative to control the speed of that motor throughout the range of armature voltage and motor field weakening in accordance with an input speed determining signal.

It is well known to control the speed of a large direct current motor proportional to the position or setting of a pair of cooperative control rheostats, with one of said rheostats being operative to adjust the motor armature voltage and the other of said rheostats being operative to adjust the motor field current.

It is an object of the present invention to provide an improved motor speed control system for a direct current motor which is better operative to vary the motor speed over the desired range for the motor in accordance with an input speed control signal that designates the desired motor operating speed and at the same time better provides optimum settings of motor armature voltage and field winding current while obtaining that desired motor operating speed.

It is a different object of the present invention to provide improved motor speed control apparatus which is more satisfactorily able to effect speed changes under load in accordance with an input speed reference signal.

It is a further object of the present invention to provide improved and more accurate motor speed control apparatus including a faster responding speed regulator to control the motor relative to a desired operating speed for fast speed and fast load changes and a slower responding modifying speed regulator to determine the desired slower changes in motor speed throughout the whole motor speed range.

Figure 1:
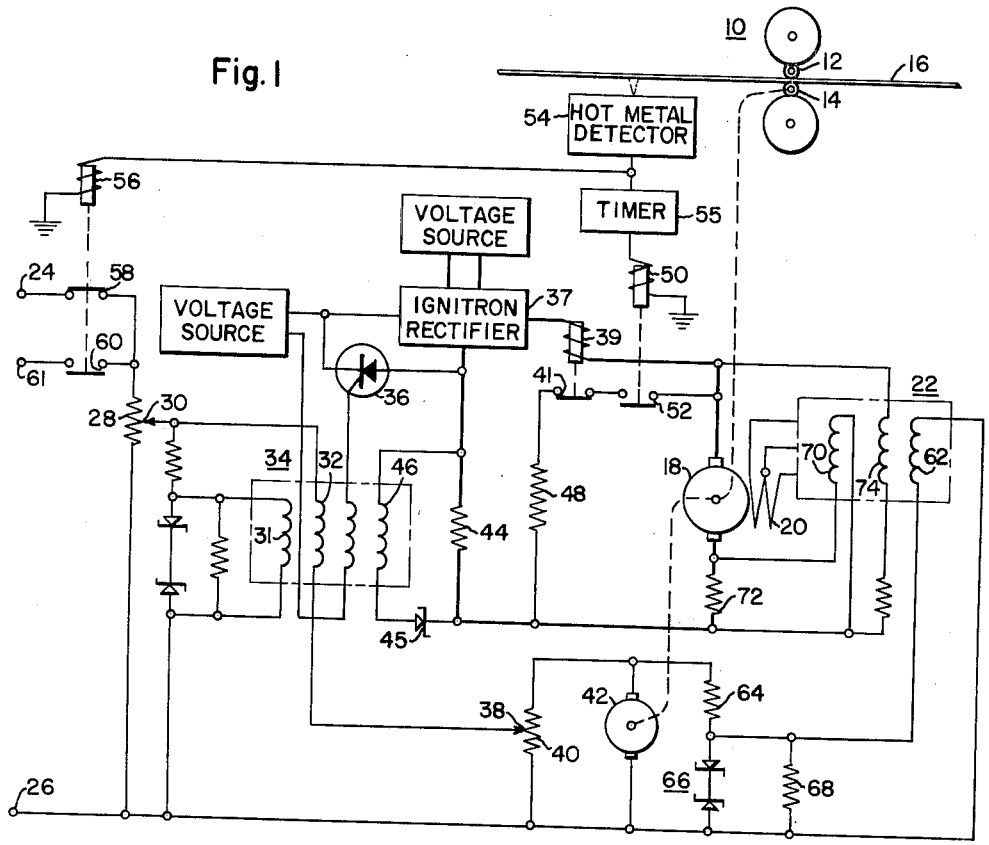
Figure 2:
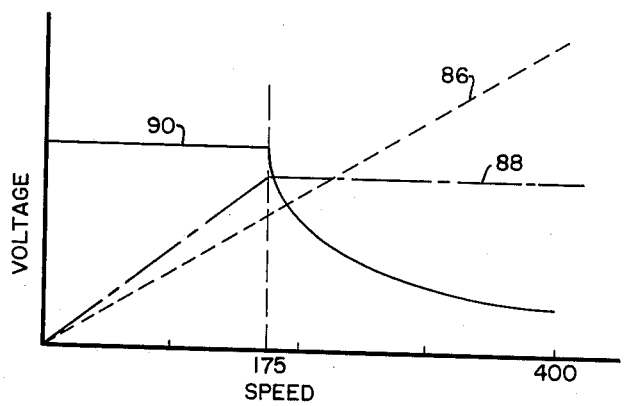

These and other objects and advantages of the present invention will become apparent in view of the following description taken in conjunction with the drawings wherein:

FIGURE 1 is a schematic showing of the motor speed control apparatus in accordance with the present invention; and FIG. 2 is a curve chart illustrating the operation of the present motor speed control apparatus.

In FIG. 1 there is shown for purpose of illustration, a metal rolling mill 10 including an upper roller 12, a lower roller 14 operative with a piece of metal 16 to be passed through the rolling mill 10. The lower roller member 14 is operative with a direct current mill motor 18 having an armature operatively connected to the lower roll 14 and having a field winding 20 operative with a magnetic amplifier 22 or the like for controlling the energization of the field winding 20.

Direct current supply terminals 24 and 26 are operative to provide a direct current desired speed reference signal across a potentiometer 28 having a movable contact arm 30 connected to a control winding 32 of a pulse position modulator 34 operative to control the firing angle or conduction period of a semiconductor controlled rectifier 36. The latter rectifier 36 is operative in a manner similar to a thyratron tube. The controlled rectifier in turn operates to control the firing angle of a well known power handling ignitron rectifier 37. This could instead if desired be a rotating generator with the controlled rectifier 36 being operative to energize a control field of same.

The control winding 32 is also connected to the movable control arm 38 of an adjustable potentiometer 40 operative with a pilot generator 42 connected with the armature of the mill motor 18 such that the pilot generator 42 provides an output signal in accordance with the operating speed of the motor 18.

The semiconductor controlled rectifier 36 is operative to control the voltage energization of the armature of the motor 18. A motor armature current sensing resistor 44 and Zener diode 45 are operative with a control winding 46 of the pulse position modulator 34 to function as a current limit control for the motor 18. A dynamic braking resistor 48 is provided for cooperation with a relay 50 having a contactor 52 for providing dynamic braking in the motor armature circuit when desired to reduce speed from running to threading speed as will be subsequently explained. The relay 50 is controlled by a signal from a hot metal detector 54 positioned adjacent the path of the metal strip 16 to determine the presence or absence of a metal strip 16 within the rolling mill 10. A control relay 56 is similarly operative with the hot metal detector 54 for controlling the operation of a contactor 58 and a contactor 60 for controlling the operation of the motor 18 as will be subsequently described.

When a particular metal strip 16 leaves the rolling mill 10, the hot metal detector 54 causes the relay 56 to open contactor 58 and close contactor 60 to provide a thread speed signal from terminal 61. The thread speed of operation of the rolling mill 10 is less than the desired running speed as well known in this art. The hot metal detector at this same time, energizes relay 50 to close contactor 52 and complete the dynamic braking circuit through resistor 48.

This results in the desired thread speed signal from potentiometer 28 being less in magnitude than the feedback actual speed signal from the potentiometer 40, such that the current supplied by the ignitron 37 goes to zero. When the dynamic braking has been effective to slow the motor 18 such that the feedback actual speed signal from potentiometer 40 corresponds to the threading speed signal from terminal 61 and potentiometer 28, the ignitron 37 again supplies current to the motor 18 and a current sensing relay 39 operates contactor 41 to open the dynamic braking circuit through the resistor 48.

The pilot generator 42 is operative to energize the field winding 20 through the magnetic amplifier 22 by suitable energization of a control winding 62. The output signal from the pilot generator 42 is directly proportional to the operating speed of the motor 18 and is applied across a resistor 64 and a Zener diode regulating circuit 66 shunted by a control resistor 68. The voltage breakdown of the Zener diode circuit 66 may be in the order of 24 volts, with the control winding 62 being connected in parallel with the Zener diode circuit 66. The magnetic amplifier 22 is also controlled by a control winding 70 responsive to the armature current of the motor 18 as sensed by a series impedance member 72 and a control winding 74 provided to respond to the voltage across the armature 18. Thusly, the control windings 70 and 74 cooperate with the winding 62 to provide a counter EMF control for the operation of the motor 18.

In FIG. 2 there is provided a curve illustrating the well known control of the operating speed of the mill motor 18 shown in FIG. 1 by a combination of armature voltage control and motor field current control. The resulting motor speed characteristic 86 is illustrated as substantially linear. The motor speed characteristic is controlled by energization of the armature voltage in accordance with the curve 88. At a base operating speed in the order of 175 r.p.m., the field current weakening regulator 22 causes the armature voltage to become substantially constant for motor operating speeds above the base speed level. Below rated armature voltage and at base speed, the motor field winding 20 is energized in accordance with the curve 90 due to an effective balance between the reference field current signal applied to winding 62 and the resultant feedback counter E.M.F. signal applied to windings 70 and 74, such that the motor field winding receives a substantially constant energization until the motor operating speed almost reaches base speed, at which point the Zener diode circuit 66 limits build up of reference signal applied to winding 62 and the motor field energization current decreases substantially in accordance with the showing of curve 90 to in effect cause the motor speed to continue to increase in a linear manner above the base operating speed of 175 r.p.m. Thusly, it will be seen from the curve 86 shown in FIG. 2 that a substantially linear motor operational speed characteristic 86 is provided by a combination of armature voltage and field winding current control as illustrated in FIG. 2.

In general, the motor speed control apparatus in accordance with the teachings of the present invention comprises a speed regulating system consisting of a speed regulator which operates primarily on armature voltage and secondarily on field current to maintain the desired speed of the motor 18 during running and threading reference speed operations and load changes. The voltage reference signal sets the rectifier 37 output voltage supplied to armature of motor 18. The voltage reference is obtained from a speed reference input signal applied across potentiometer 28 and its contact arm 30 to energize a pattern winding 31 and the control winding 32 of the pulse portion modulator 34 to control the firing of the controlled rectifier 36 and in turn the ignitron 37 to give a voltage applied to the armature of the motor 18 substantially proportional to that reference input signal until the base speed of the motor is reached as shown by the curve 88 of FIG. 2, and then set a substantially constant output voltage from the semiconductor controlled rectifier 36 except for regulating action throughout the above base speed or field range of the motor 18.

The motor field winding 20 is controlled by a motor field current regulator which is biased to provide full field energization of the motor up to approximately base operating speed of the motor 18. The field current regulator obtains its reference from a counter electromotive force regulator. The latter regulator provides an integral type control by self-energizing such that no steady state error signal is required to provide the desired field current. The counter electromotive force regulator senses the motor counter electromotive force through windings 70 and 74 by noting the difference between the measured values of motor terminal voltage and the motor IR drop. The latter regulator obtains its reference from motor speed through the operation of the pilot generator 42 and the winding 62. This regulator holds the motor counter E.M.F. proportional to the motor speed for all value below base speed and by clipping the reference signal regulates for a constant counter E.M.F. above the base speed of the motor 18.

The present control apparatus uses the controlled variable of speed to determine the level of the flux within the control field winding 20 which in turn determines the operating speed of the motor 18. This is possible because of the difference in speed of response of the armature voltage regulator and the field winding current regulator. The faster acting armature voltage regulator including the semiconductor controlled rectifier 36 maintains the desired running speed of the motor 18 by varying the terminal voltage of ignitron 37 and thereby varying the energization of the armature of the motor 18 to hold the operating speed of the motor in accordance with the desired speed signal or reference signal applied to potentiometer 28 and the setting of the control arm 30 on the potentiometer 28. The slower responding motor field current regulator then modifies the field flux to provide the proper value of motor field current and thereby motor field flux for any desired operating speed of the motor 18. Thusly, the motor armature voltage regulator can follow a fast speed and load change about a desired operating motor speed, and the motor field current regulator is operative to follow the slower changes in speed throughout the motor speed range. The curve provided in FIG. 2 shows the motor speed control apparatus parameters as the desired operating speed is changed as a ramp function from zero to top speed.

In actual practice the present speed control apparatus was operative with a motor to control the error in actual speed as compared to a desired operating speed in the order of one-tenth of one percent during the complete range of the illustrated speed characteristic between zero speed and a top operating speed of 450 r.p.m.

Thusly, it will be seen that the present motor speed control apparatus uses the motor speed, which is the controlled variable, to determine the operation of the speed control apparatus such that the motor armature voltage and the motor field winding current are maintained at their optimum settings for a particular desired value of motor operating speed. In other words, the motor 18 is continuously operated at the maximum value of field current and motor armature voltage or motor torque that will permit a particular desired operating speed for the motor 18.

Any operating motor speed can be selected by changing only the setting of the control arm 30 on the speed reference potentiometer 28 and without any change in recalibrating the feedback potentiometer 40. This allows the motor operating speed to follow one or an algebraic sum of several speed reference signals as may be desired, and requires no recalibration of the control apparatus other than the desired speed reference adjustment for the different operating levels of the motor 18 as determined by the running speed signal terminal 24 and the threading speed signal terminal 61. In any particular case, the operating speed of the rolling mill 10 will be a function of the speed reference signal from either terminal 24 or 61 and the position of the stand rheostat 28.

The use of the controlled variable to set system parameters allows the application or removal of the speed reference signal and still holds the system parameters at the proper level for a particular operating speed by suitably delaying field flux weakening to provide optimum operation of the motor 18. Thusly, the desired speed reference signal as provided by the potentiometer 28 can be completely removed or lowered in a step change and the motor 18 will be decelerated at the proper value of field strength and motor armature voltage at each speed point. Thusly, the armature voltage will hold at rated voltage until full field speed is reached and then decrease proportional to speed until the motor stops.

In general in the desired operation of the present motor speed control apparatus, the armature voltage control is utilized as much as practical for determining the operating speed of the motor 18 and the field weakening is used as little as practical. However, for deceleration of the motor, the field strength is maintained to give a maximum dynamic braking effect through the operation of the dynamic braking resistor 48. Prior to the time when the strip enters or is about to enter the rolling mill 10, the relay 56 closes the contactor 60 such that a desired threading speed reference signal is provided by the setting of the contact arm 30 to determine the firing angle of the rectifier 36 or energization of the armature of the motor 18 for setting the desired threading speed of the rolling mill 10. After the strip initially passes through the front end of the mill 10 the contactor 60 is opened and contactor 58 is closed to provide desired running speed reference signal. It should be noted that the speed reference signal applied to terminal 24 substantially matches the threading speed signal at the time that contactor 58 is first closed. Then the speed reference signal is caused to increase as a ramp function up to running speed value. After the whole strip passes through the mill 10, the HMD 54 senses the absence of strip 16 and closes contactor 52 for a time period controlled by timer 55 to introduce dynamic braking and opens the contactor 58 and closes the contactor 60 such that the desired running speed reference signal is no longer provided and instead the threading speed signal is supplied by the movable contact arm 30. The energization of the motor field 20 is maintained by the output signal from the pilot generator 42 to provide the desired maximum braking effect.

It should be noted that in the operation of the present motor speed control apparatus, the desired speed reference signal from the potentiometer 28 is operative to provide a reference energization of the motor armature circuit, and an opposing feedback actual motor speed signal is provided by the potentiometer 40 such that the control winding 32 is energized by the net difference between the dsired speed reference signal received from the potentiometer 28 and the opposing actual speed signal from the potentiometer 40. The control winding 31 is energized by a basic voltage excitation to maintain the operation of ignitron 37 when the speed reference signal and speed feedback signal match each other. Thusly, a signal comparison is made for providing a correction energization to the armature of the motor 18 in accordance with any speed error or difference between the desired speed for the motor and the actual operating speed of the motor. On the other hand, the control field winding 20 is energized in accordance with the actual motor speed signal from the pilot generator 42, with a signal limiting circuit being provided to shape the motor field energization to give a maximum field strength up to approximately base operating speed and to decrease the control field energization beyond said base speed proportional to the input desired speed signal up to full operating speed for the motor.

Although the present invention has been described with a certain degree of particularity, it should be understood that the present disclosure has been made only by way of example and that numerous changes in the details of construction and combination and arrangement of parts may be resorted to without departing from the scope and spirit of this invention.

I claim as my invention:

1. In speed control apparatus for a motor having an armature and a field winding, the combination of speed reference signal means for providing a speed signal in accordance with the desired motor operating speed, first regulator means responsive to said speed signal and to the actual speed of the motor and operative to energize said armature to cause the motor to operate in accordance with a predetermined relationship between said speed signal and the actual motor speed, and second regulator means responsive to the actual speed of the motor and the counter electromotive force of the motor, and being operative to energize said field winding in accordance with a predetermined relationship between said actual speed of the motor and said counter electromotive force of the motor, with said first regulator means being faster acting than said second regulator means.

2. In speed control apparatus for a motor having an armature and a field winding, the combination of speed reference signal means for providing a speed reference signal in accordance with the desired motor operating speed, first regulator means responsive to said speed signal and to the actual speed of the motor and operative to energize said armature to cause the motor to operate in accordance with a predetermined opposition relationship between said speed signal and the actual motor speed, and second regulator means responsive to the actual speed of the motor and the counter electromotive force of the motor and operative to provide a progressively decreasing energization of said field winding in accordance with a predetermined relationship between the increase of said actual speed of the motor and the increase of said counter electromotive force of the motor as a function of said actual speed.

3. In speed control apparatus for a motor having an armature and a field winding, the combination of speed reference signal means for providing a speed signal in accordance with the desired motor operating speed, first regulator means responsive to said speed signal and to the actual speed of the motor and operative to energize said armature to cause the motor to operate in accordance with a predetermined relationship between said speed signal and the actual motor speed, said second regulator means responsive to the actual speed of the motor and the counter electromotive force of the motor and operative during acceleration of the motor to decrease the energization of said field winding in accordance with a predetermined relationship between said actual speed of the motor and said counter electromotive force of the motor, with said second regulator means being operative during deceleration of the motor to maintain a predetermined energization of said field winding for the purpose of dynamic braking in accordance with the actual speed of said motor.

4. In speed control apparatus for a motor having an armature and a field winding, the combination of desired speed signal means for providing a desired speed signal in accordance with the desired motor operating speed characteristic, actual speed signal means operative with the motor for providing an actual speed signal, first regulator means responsive to said desired speed signal and to said actual speed signal for energizing said armature to control the actual speed of the motor in accordance with a speed error correcting opposition relationship between said desired speed signal and said actual speed signal, and second regulator means responsive to said actual speed signal and to the counter electromotive force generated by said motor for energizing said field winding to provide a predetermined decrease in the energization of said field winding above a predetermined operational speed of said motor.

5. In speed control apparatus for a motor having an armature and a field winding, the combination of desired speed signal means for providing a desired speed signal in accordance with a desired motor operating speed characteristic, actual speed signal means operative with the motor for providing an actual speed signal, first speed regulator means responsive to said desired speed signal and to said actual speed signal for energizing said armature to control the actual speed of the motor in accordance with a predetermined relationship between said desired speed characteristic and said actual speed, and second speed regulator means responsive to said actual speed signal and to the counter electromotive force generated by said motor for energizing said field winding to provide a predetermined decreasing energization of said field winding during acceleration of the motor above a predetermined operational speed of said motor and to provide a predetermined minimum energization of said field winding during deceleration of the motor for a predetermined time period and in accordance with the actual speed of the motor.

6. In speed control apparatus for a motor having an armature and a field winding, the combination of input signal means for providing a motor speed reference control signal, first speed control means operative with said armature and responsive to said reference control signal for providing a first energization to the motor armature during a first portion of the speed characteristic of the motor and for providing a second energization to the motor armature during a second portion of the speed characteristic of the motor, second speed control means operative with said field winding and responsive to the actual speed of the motor for energizing the motor field winding to have a full field energization during said first portion of the speed characteristic and energizing the motor field winding to have a predetermined decreased field energization during said second portion of the speed characteristic, with said first speed control means being faster acting than said second speed control means.

References Cited by the Examiner

UNITED STATES PATENTS

| | | | |
|---|---|---|---|
| 2,964,691 | 12/60 | Dinger | 318—338 |
| 3,026,464 | 3/62 | Greening et al. | 318—338 X |

ORIS L. RADER, *Primary Examiner.*